United States Patent [19]

Martin

[11] Patent Number: 4,601,412

[45] Date of Patent: Jul. 22, 1986

[54] POLYMERIC GREASE GUN

[75] Inventor: Donald E. Martin, Waukesha, Wis.

[73] Assignee: Rexnord Inc., Brookfield, Wis.

[21] Appl. No.: 549,351

[22] Filed: Nov. 7, 1983

[51] Int. Cl.⁴ .............................................. G01F 11/00
[52] U.S. Cl. .................................. 222/256; 222/324; 222/386
[58] Field of Search ................ 285/396, 402; 222/153, 222/252, 256, 323, 324, 372, 386, 391, 340, 387, 472, 474, 383

[56] References Cited

U.S. PATENT DOCUMENTS

| | | | |
|---|---|---|---|
| 1,014,108 | 1/1912 | Wild | 285/396 X |
| 1,349,994 | 8/1920 | Wood | 222/256 X |
| 1,368,840 | 2/1921 | Rischard | 222/256 |
| 2,978,151 | 4/1961 | Sundholm | 222/256 X |
| 3,338,478 | 8/1967 | Hedblad | 222/256 X |

FOREIGN PATENT DOCUMENTS 383055 11/1932 United Kingdom ................ 285/396

Primary Examiner—Joseph J. Rolla
Assistant Examiner—Michael S. Huppert
Attorney, Agent, or Firm—Lawrence J. Crain

[57] ABSTRACT

A polymeric grease gun comprising a tubular body of polymeric material which defines a chamber for containing grease, a forward end cap having a grease pump, pump lever and a nozzle, a polymeric rear end cap, and a plunger for urging grease forward into the chamber, where the end caps are secured to the tubular body by means of lugs at each end of the tube which engage blind-ended arcuate slots in the leading edge of the end caps so that the caps are retained on the body against an internal axial force which tends to separate the caps from the body. The caps are also secured on the tubular body by means of springing members extending from the ends of the tubular body which engage corresponding portions of the end caps so that the springing members are resiliently held against the interior of the caps.

10 Claims, 4 Drawing Figures

POLYMERIC GREASE GUN

BACKGROUND OF THE INVENTION

This invention relates to grease guns and more specifically to a grease gun of exceptional strength and use convenience which is formed of a polymeric material.

A grease gun is a device of injecting grease under pressure into a bearing cavity through a fitting such as a grease nipple. Conventional grease guns have been essentially unchanged for years and are widely regarded as being entirely adequate in their present design. However, I have ascertained several aspects of the conventional grease gun which I believe is susceptible of substantial improvement.

The conventional grease gun barrel is a cylindrical steel tube threaded at each end. The tube is sometimes knurled to improve the grip on the barrel and is stamped or inscribed with the name of the manufacturer or the OEM distributor, and then is painted for appearance and rust protection. Likewise, the pump lever which is linked to the head cap of the grease gun is a steel member drilled to receive the pins which connect it to the head cap and also to the pump piston and is painted for appearance and rust protection.

Finally, the end cap is a steel member internally threaded to be threaded onto the end of the barrel and painted like the barrel and the handle for appearance and rust protection.

Although many of the operations required to produce these parts are formed by automated operations, the cost is relatively high compared to, for example, plastic molding operations. Moreover, the steel members are heavy and can become tiring to a mechanic or service person who must work overhead or in cramped positions to reach the grease fittings on the machinery on which he is working. The steel barrel often becomes coated with grease in use and can become slippery which, combined with its heavy weight, increases the likelihood that it will slip from the hands of the service person and fall onto equipment or other persons with consequent damage. Moreover, the rough handling that a grease gun often receives invariably results in the paint coating becoming chipped and scratched which defeats the rust prevention purpose and also detracts from its appearance, with consequent adverse affect on the image or good name of the manufacturer or OEM supplier.

One further problem with steel grease gun parts is that they are thermally and electrically conductive. In the winter when the temperature is very cold, the steel barrel of a conventional grease gun can be very uncomfortable to hold because it feels so cold to the skin. In addition, in certain locations in which grease guns are commonly used, such as farms and equipment leasing operations, it is not uncommon for electrical wiring to be exposed and susceptible to contact by a grease gun in the hands of a service person. An electrically insulated grease gun would not expose the service person to this danger.

It occurred to me that use of plastic parts in a grease gun would eliminate many of the disadvantages noted above. However, most plastic materials have properties which would make them unsuitable for use as substitute materials in the conventional grease gun parts. This may explain the absence of plastic grease guns on the market. One such property is a decrease in impact resistance at low temperature. Since a grease gun is often used in cold temperatures and is frequently dropped, sometimes from considerable heights, a low impact resistance would be a severe drawback to the use of plastic parts in a grease gun. In addition, the threading of plastic parts decreases their strength because of the notch effect of the threads in the plastic which creates a stress concentration which leads to formation of a crack which then propagates through the plastic quickly and causes a complete fracture of the plastic part. Finally, plastic threads can easily become cross-threaded unless care is taken to thread it properly and cross-threading can permanently damage the threaded end of the plastic part. This would cause misalignment between the barrel and the head cap which could prevent the grease seal from functioning properly at that location and therefore cause leakage of grease. Finally, the automatic unthreading of a plastic part from the mold requires the use of an expensive machine which would decrease the cost savings which the use of plastic parts would achieve.

SUMMARY OF THE INVENTION

Accordingly, it is an object of this invention to provide plastic parts for a grease gun which have high impact resistance. Another object of the invention is to provide a grease gun having a surface design and texture which facilitates a secure grip by the hands of the user. Another object of the invention is to provide a quick and secure structure for attaching the end cap and the head cap to the barrel of the grease gun which ensures a reliable grease seal and yet is easily and quickly disconnected.

These and other objects of the invention are attained in a preferred embodiment having a tubular body of elastomeric material, both ends of which include two or more radially projecting locking lugs extending from the outside surface of the barrel. Both the end cap and the head cap are provided with arcuate slots opening into the lip of the cap and curved to provide a hump in the slot wall over which the lug passes when the cap is turned onto the barrel. An axial force is exerted on the cap tending to push it off the barrel which holds the lug seated in the low portion of the slot adjacent the blind end thereof. The axial force exerted on the caps is an elastomeric seal ring at the head cap end and is a camming action of the barrel lip flexed inward and bearing outward against a tapered surface on the inside of the end cap.

DESCRIPTION OF THE DRAWINGS

The invention and its many attendant objects and advantages will be better understood upon reading the following description of the preferred embodiment in conjunction with the following drawings, wherein.

DESCRIPTION OF THE PREFERRED EMBODIMENT

Figure 1:
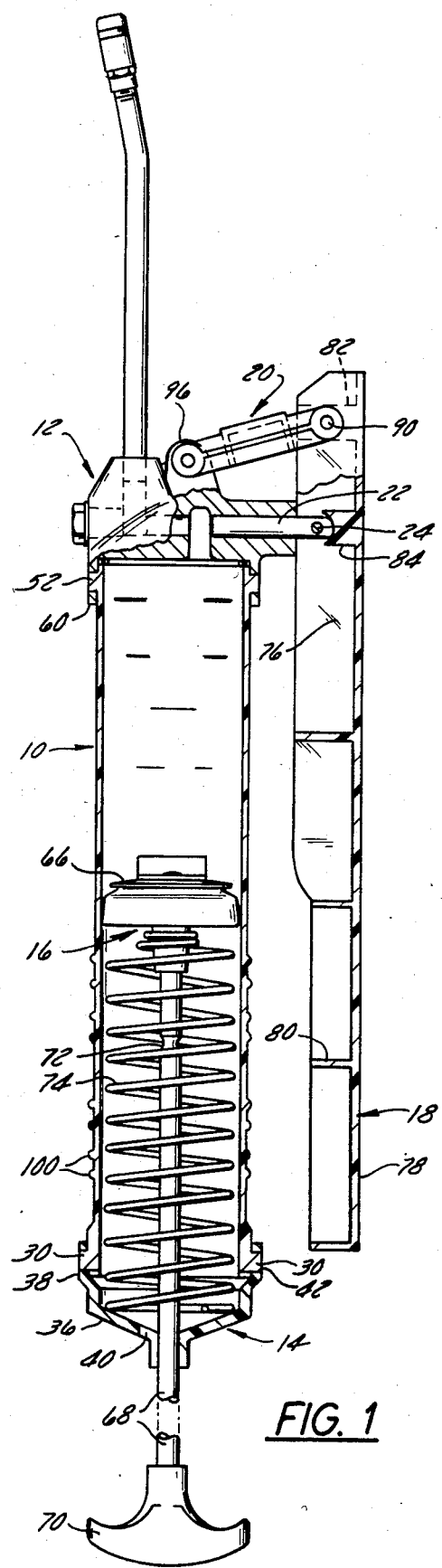
FIG. 1 is a sectional elevation of a grease gun made in accordance with this invention.
Figure 4:
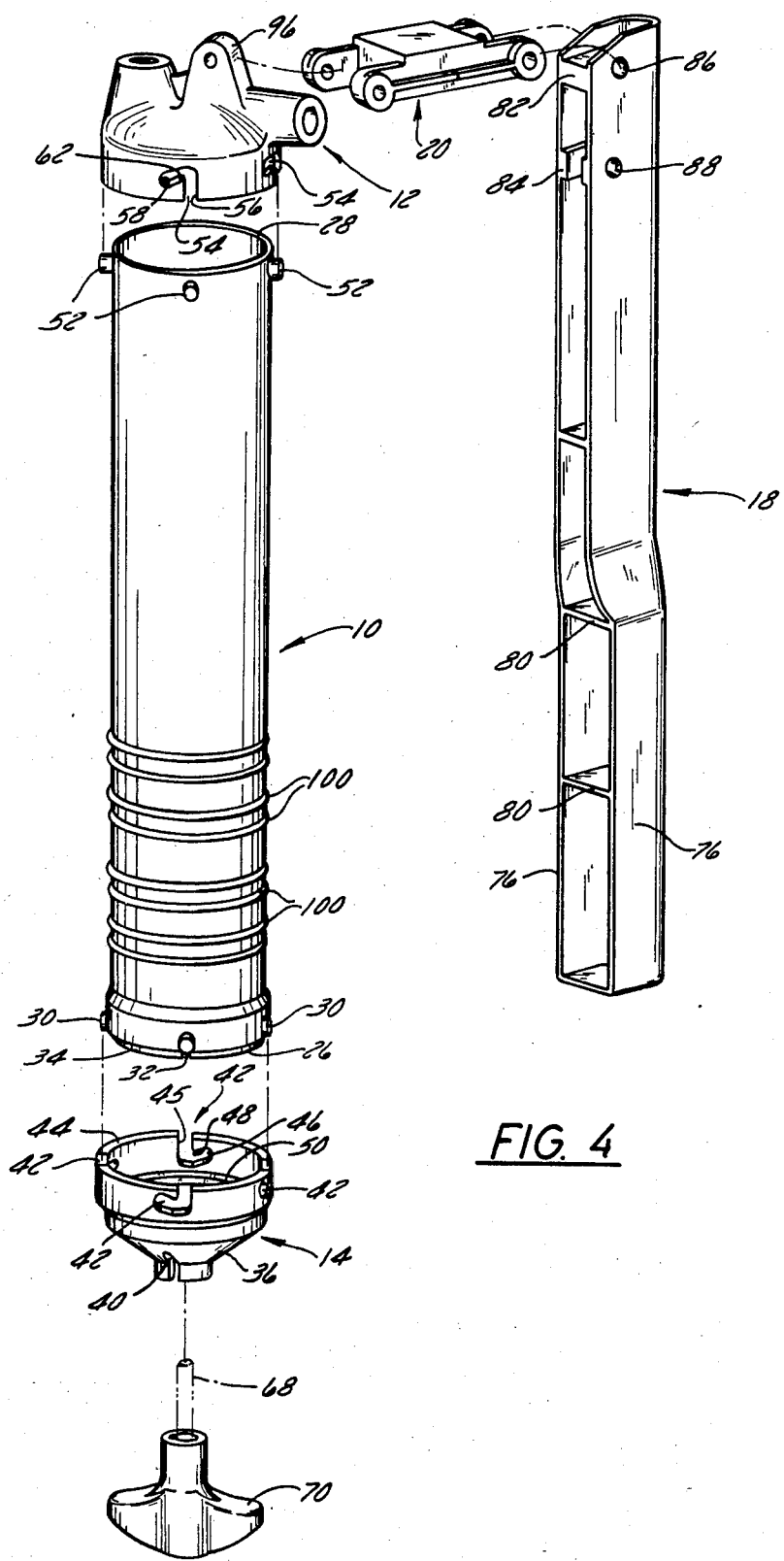
FIG. 4 is an exploded view of the grease gun shown in FIG. 1.

Referring now to the drawings, wherein like reference numerals indicate identical or corresponding parts, and more particularly to FIG. 1 thereof, a grease gun is shown having a barrel or tubular body 10 having two open ends. A head cap 12 is removably secured to the head end of the barrel 10 and an end cap 14 is removably secured to the rear end of the barrel 10. A plunger 16 is spring loaded in the barrel 10 and urges a charge of grease held in the barrel toward the head end. A grease pump in the head cap 12 is operated by a pump lever 18 which is connected at its head end to the head cap 12 by a link 20 and is pinned to a piston rod 22 of the grease pump at a pin connection 24.

The barrel or tubular body 10 of the grease gun is a cylindrical member having a cylindrical outer wall surface and an inner wall surface which tapers from the rear lip 26 of the barrel 10 forwardly. The taper facilitates withdrawal of the molding core and also preserves material due to the gradual thinning of the wall surface toward the rear end of the barrel. This is appropriate because the greatest strength required of the barrel is at the front end where the barrel connects to the head cap 12 and is subjected to the greatest stresses during operation of the grease pump, as will be explained further below. The taper of the inner wall surface of the body 10 terminates about an inch from the head lip 28 so that the wall thickness of the head end of the barrel 10 is uniform in the vicinity of the connection of the head cap. This short length of cylindrical inner wall surface is short enough so as not to interfere with the withdrawal of the molding core during the demolding operation.

At the rear end of the body, about ½ inch forward of the rear lip 26, a series of four equiangular spaced lugs 30 are integrally molded onto the outside surface of the barrel projecting radially outward. The cross-sectional shape of the lugs on a plane parallel to the axis of the barrel and perpendicular to the radius through the lug is circular. An axially elongated radial slot through the barrel wall extends from the rear lip 26 to each of the four lugs 30 on the rear end of the barrel. Each of the slots terminates adjacent the lug in a rounded end to avoid stress concentrations when the plastic flexes in that vicinity. The four sectors of the barrel wall between the lip 26 and the lugs 30 between the slots 32 constitute spring fingers 34 for a purpose to be described below. The wall thickness of the body wall in the vicinity of the lugs 30 is increased to provide increased strength to support the lugs and their locking function and also to give increased resilience and durability to the spring fingers 34. The wall thickness is reduced to its normal thickness a short distance forward of the lugs 30 to provide its smooth transition to the wall surface to provide a flush surface on which the inner surface of the end cap skirt can lie for support, exclusion of dirt and grit, and aesthetic appearance.

Figure 2:
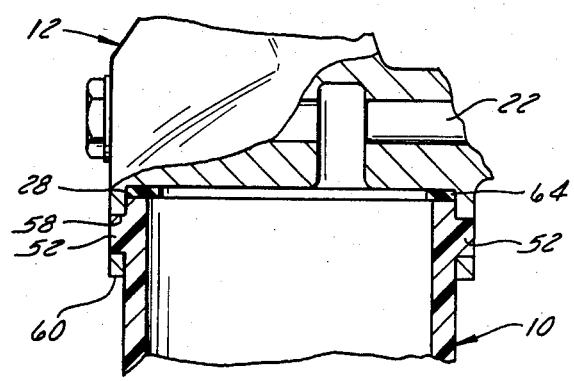
FIG. 2 shows a detail of the connection between the barrel and head cap of the grease gun shown in FIG. 1.
Figure 3:
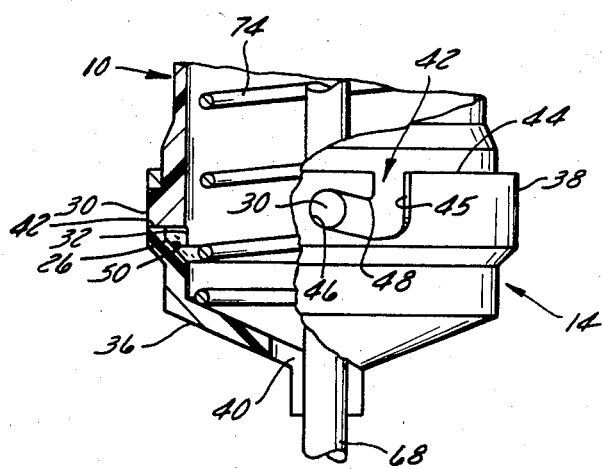
FIG. 3 is a prospective view of the end cap of the grease gun shown in FIG. 1.

Looking now at FIG. 3, the end cap 14 includes a cup section 36 at the closed end and a depending skirt 38 integrally formed on the cup section 36. A keyhole opening 40 is formed on the center line of the cup section 36 for receiving a plunger rod, to be explained below.

An arcuate slot 42 is formed in the depending skirt 38. The slot 42 opens in the free edge 44, extends axially for a short distance and then curves in the counterclockwise direction and describes a slight arc which is concave toward the open end of the end cap. The curved portion of the slot terminates in a blind end 46 which is slightly closer to the free edge of the skirt 38 than the portion of the slot immediately clockwise of the end portion to provide a slight hump 48 in the wall of the slot 42. The hump 48 constitutes a slight incline over which the lugs 30 must pass before they can reach the axial portion 45 of the slot 42.

The tapered section 50 of the cap is spaced axially on the cap relative to the position of the arcuate slot 42 so that, when the cap is turned onto the end of the barrel, the chamferred surface of the lip 26 engages the tapered section 50 to cam the spring fingers 34 radially inward. As the cap 14 is turned so that the lugs 30 pass over the hump 48 in the slot 42, the cap moves slightly axially outward on the barrel so that the lugs 30 lie in the slight depression in the blind end 46 of the slot 42. In order for the cap to rotate counterclockwise to align the lugs 30 with the axial portion 45 of the slot 42, it is necessary for the cup 42 to move axially slightly inward in order for the lugs 30 to pass over the hump 48. This inward motion is opposed by the resiliently flexed spring fingers 34 acting against the tapered section 50 in the cap and therefore the cap stays firmly locked in place until it is rotated with sufficient torque to flex the spring fingers 34 radially inward.

The head cap 12 is fastened to the barrel 10 in a manner similar to that of the end cap 14. A series of four radially extending lugs spaced equally around the circumference of the barrel 10 are aligned with a series of four arcuate slots 54. The arcuate slots 54 are similar in shape to the arcuate slots 42 in the end cap 14 with the exception that the axial portion 56 is not as long as the axial portion 45 of the slot 42 because the head cap 12 is formed of cast iron. Like the arcuate slot 42, the arcuate slot 54 includes a blind end 58 which lies closer to the free edge 60 of the head cap 12 to produce a hump 62 whose purpose is the same as the hump 48 in the wall of the slot 42.

A seal ring 64 is mounted in an annular recess in the inside surface of the head cap 12 in axial alignment with the head lip 28 of the barrel 10. When the head cap is turned onto the head end of the barrel 10, the lugs 52 pass over the hump 62 in the slot 54 to compress the elastomeric seal ring 64. The elastomeric seal ring exerts an axial force on the lip 28 tending to hold the lugs 52 in the blind end 58 of the slot 54 and in order for the head end of the cap to be removed from the barrel, it is necessary to exert an axial force to compress the seal ring to allow the lugs 52 to, in effect, climb over the hump 62 in order to reach the axial section 56 of the slot 54.

The plunger 16 includes a disc 66 secured to the end of a rod 68. The other end of the rod 68 has a handle 70 attached to it for providing a comfortable hand grip with which to pull the rod to the rear when the grease gun is to be loaded in the conventional manner. The rod 68 has a neck down portion 72 which is about equal in diameter to the small portion of the keyhole opening 40 in the end of the end cap 14 so that the neck down portion 72 may be fitted into the small portion of the keyhole opening 40 to hold the rod in its rearward position against the force of a spring 74 compressed between the disc 66 and the inside of the end cap 14. The function of the spring 74 is to exert a constant forward pressure on the charge of grease in the barrel 10 to facilitate filling the pressure chamber in the grease pump in the head cap 12.

The handle 18 is a channel shaped member having two depending sides 76 connected by a bridging wall 78. The channel shaped pump lever opens toward the barrel 10 so that hand pressure exerted to pressure the grease by way of the piston rod 22 is borne by the smooth outer surface of the bridging wall 78 rather than the edges of the pump lever side 76. A series of narrow braces 80 extending between the pump lever sides 76 is provided to stiffen the pump lever. Two additional braces 82 and 84 are provided adjacent the front end of the pump lever to give a means for connecting the pump lever to the head cap and for connecting the pump piston rod 22 to the pump lever. A hole 86 and 88 is drilled laterally through the braces 82 and 84, respectively, to receive a connecting pin. The pin 90 connects the end of the pump lever to the link 20 and the pin 24 connects the clevis at the end of the piston rod to the brace 84 of the pump lever 18.

The link 20 has a clevis at each end integrally formed as part of the link and is pinned to the end of the pump lever by means of the pin 90. Likewise, the other end of the link 20, also formed integrally as a clevis, is connected to an ear 96 cast integrally as part of the head cap 12.

The material of which the barrel 10, the end cap 14, the plunger handle 70, the pump lever 18, and the link 20 are formed is acetal. Acetal resin has the desirable property of strength retention at high and low temperatures and therefore is not subject to brittleness at low temperatures or to degredation at high temperatures, for example, in a storage warehouse. The material may be protected from ultraviolet radiation by an ultraviolet stabilizer which does not add color and therefore virtually any color my be added to the plastic while it is being formulated. In this way, the color goes entirely through the material and is not subject to decline in appearance because of rough treatment which would chip and scratch the paint on a conventional painted steel grease gun.

Some large OEM equipment manufacturers prefer to offer grease guns to their customers for use with their equipment. Some of these OEM manufacturers always use a particular color on their equipment to help associate the equipment and its associated items with that OEM supplier. With this invention, it is possible for the grease gun supplier to provide custom colored grease guns to its OEM customers in their own proprietary colors. The colors naturally go entirely through the plastic material and so they are not subject to decline in appearance and therefore the name and repuntion of the OEM equipment supplier is not threatened by ugly products.

The end cap and the head cap are attached by the lug lock mechanism shown, the plastic materil is not weakened by use of threads which produce notches in the material which weaken its impact resistance. For example, the notched izod of acetal is 1.3 whereas the unnotched izod of the same material is 20. This means that the resistance to impact breakage is approximately 15 times greater using the disclosed lug lock attachment combination rather than using threads. In addition, the threads in plstic material have been known to jump when subjected to a moment. It occasionally occurs that the grease nipple in a piece of equipment becomes frozen or blocked with oxidized grease and must be cleared by forcing grease from the grease gun through the nipple. This is normally done simply by exerting a great force on the pump lever to greatly pressurize the grease in the grease pump and blow grease through the clogged nipple. However, such force exerts a moment on the head cap since the pumping forces exerted by the two hands, one on the lower end of the barrel 10 and the other on the lower end of the pump lever 18. This considerable moment between the head cap and the head end of the barrel would tend to make the head cap jump a thread. The jumped thread would make it difficult to unscrew the head cap from the barrel if it were a simple threaded connection and would also adversely affect the grease seal at that end. By the use of the lug lock combination, the head cap is securely held in its correct position on the head end of the barrel and the only way in which that position could be changed would be to shear off the lugs 52. The shear strength of the lugs at this position is much greater than can be exerted by even an extremely strong serviceman and therefore this mode of damage is precluded.

The surface of the barrel 10 is textured to provide a surface roughness and feed similar to that of fine suede leather. The hand grip on such a surface is extremely secure and the feel to the hand is very comfortable. In addition, a series of ridges 100 may be molded on the outer surface of the barrel 10 to provide an additional security to the hand grip.

The plastic material is electrically and thermally nonconductive and therefore, if the neck of the grease gun comes in contact with a live electric wire, for example, the electricity will not be conducted through the barrel of the grease gun or the handles to the hand of the user. In addition, even in the coldest weather the barrel of the grease gun is quite comfortable to hold because it does not conduct heat away from the hand of the user.

The light weight of the material makes a grease gun according to this invention much lighter and less tiring to handle over a period of time. In addition, the lug lock fastener makes the insertion of a new grease cartridge a much faster and easier operation because the lengthy unscrewing of the head cap or end cap required in the prior art is not required in this invention. A turn of less than a one-quarter turn is sufficient to release the head cap or the end cap and the reattachment of the head or end cap is also a simple operation and can be done easily even in the dark or with gloves on.

Obviously, numerous modifications and variations of the disclosed preferred embodiment will occur to those skilled in the art. Accordingly, it is expressly to be understood that these modifications and variations, and the equivalents thereof, may be practiced while remaining within the spirit and scope of the invention as defined in the following claims.

What is claimed is:

1. A grease gun having a head cap containing a grease pump including a piston for pressurizing grease in a pressure chamber and communicating with a neck having a nozzle at the free end thereof, a pump lever linked to the head cap for operating the pump piston, a tubular body to which the head cap is fastened and which is adapted to contain grease, an end cap for closing the rear end of the tubular body, a plunger for urging the grease in the tubular body forward to fill the pressure chamber, a spring for urging the plunger forward, a plunger rod extending through a hole in the end cap, and a handle on the rear end of the rod, wherein the improvement comprises:

said tubular body comprised of a rear end having a lip and a front end having a lip;

a plurality of radially extending lugs on the outside surface of both ends of said tubular body;

a plurality of arcuate slots opening in the free edge of said end cap and said head cap, said slots being positioned to receive said lugs when said caps are placed on the ends of said tubular body with the open end of said slot in alignment with said lugs, said slots being curved to provide a blind end portion closer to the free edge of its respective cap than an intermediate portion of said slot between the open and blind end thereof;

internal means for exerting an axial force tending to separate said caps from said body such that said lugs will remain seated in said blind ends when said caps are turned onto the ends of said body with said lugs engaged in said slots;

said axial force exerting means at said ends of said body including a plurality of slots in said body to form a plurality of axially extending, circumferentially curved spring fingers, and a portion of said end caps configured so as to matingly engage the lips of said body ends and cam said lips radially inward to resiliently flex said spring fingers which exert an outwardly directed force on said engaging portion of said end caps which resolves said force into an axial component and a radial component;

said rear lip of said body is configured on the outer corner thereof to provide a surface lying at about the same angle as said engaged portion of said end cap to facilitate the camming of said spring fingers when said end cap is lug-locked on; and said slots each extending from the rear lip of said body to one of said lugs, respectively, and terminating in a rounded end adjacent to the rear edge of said lug.

2. A grease gun, comprising a tubular body formed of a polymeric material, having a forward end with a lip and a rear end with a lip, and having a tubular wall with a slightly tapering inner wall surface defining a main chamber for containing grease, said body having a plurality of angularly spaced radially projecting lugs at both ends on the outside surface thereof, said rear end having a plurality of radial slots through said body and extending axially to a point beyond the forward extent of said lugs on said rear end, said slots dividing the rear portion of said tubular wall into a plurality of end sectors;

a forwardly opening end cap formed of polymeric material and having a depending cylindrical skirt integral with a rearward cup section in which a keyhole opening is formed, said skirt joined to said cup section by a rearwardly tapering section which engages said rear lip of said tubular body to cam said end sectors and said lugs radially inward to resiliently flex said sectors and create an axial separating force between said body and said end cap, said skirt having a plurality of angularly spaced, forwardly opening arcuate slots therein which curve rearwardly and terminate in a blind end forwardly of the rearmost portion of said slot to produce a hump in the wall of said slot over which a respective one of said rear end lugs passes when said end cap is turned onto said tubular body and which, in conjunction with said axial separating force, holds said end caps in place on the rear end of said body;

a head cap having a tubular skirt connected to a forward cup section, a grease pump in said forward cup section including a piston extending radially beyond said head cap, a pressure chamber in which said piston moves to pressurize grease therein, and a neck communicating with said pressure chamber, an elastomeric seal ring which can be compressed between the inner surface of said head cap and the forward lip of said tubular body to seal said head cap to said tubular body and prevent leakage of grease therebetween, and also to generate a front end separating force between said body and said head cap, said tubular skirt having a plurality of angularly spaced rearwardly opening arcuate slots therein which curve forwardly and terminate in a blind end rearwardly of the forwardmost portion of said slot to produce a hump in the wall of said head cap slot over which a respective one of said front end lugs passes when said head cap is turned on to said tubular body front end and which, in conjunction with said front end separating force exerted by said elastomeric seal ring, holds said head cap in place on said body front end; and a plunger within said tubular body for exerting an upward force on the grease in said body, said plunger including a rod extending through said keyhole opening, a handle on the rear end of said rod, a plunger disk having a peripheral edge seal for engaging the inner wall surface of said tubular body, and a spring compressed between the backside of said plunger disk and the inside of said end cap.

3. The grease gun defined in claim 2, wherein the forward end of said radial slots each terminate in a rounded end at one of said lugs, respectively.

4. The grease gun defined in claim 2, wherein said rear lip of said body is tapered on the outer surface at an angle corresponding to the taper angle of said rearwardly tapering section in said end cap.

5. The grease gun defined in claim 2, wherein said body inside wall is tapered from the rear end toward the forward end.

6. The grease gun defined in claim 5, wherein said tubular wall has a cylindrical outside surface.

7. The grease gun defined in claim 2, wherein said polymeric material is acetal.

8. The grease gun defined in claim 2, further comprising:

a section of said tubular wall in the vacinity of said lugs which is substantially thicker than the wall thickness in the central portion of said body, said section joined to said tubular wall with a smooth fillet which extends fully around said tubular wall at the junction of said thickened wall section and the balance of said tubular wall to support said lugs.

9. The grease gun defined in claim 2, further comprising a series of axially spaced ridges encircling said tubular body and projecting outwardly from the outside surface thereof to facilitate secure grip thereof by hand.

10. The grease gun defined in claim 2, wherein said tubular body, said pump lever, said end cap and said rod handle are all formed of acetal which is all tinted the same color and said color is throughout all portions of these acetal parts.

* * * * *